Patented Sept. 22, 1953

2,653,089

UNITED STATES PATENT OFFICE 2,653,089

RECOVERY OF HEAVY METALS

Jesse M. Brooke, Old Ocean, Tex., assignor to Phillips Petroleum Company, a corporation of Delaware No Drawing. Application November 7, 1949, Serial No. 126,043

8 Claims. (Cl. 75—108)

This invention relates to a method for recovering heavy metals from dilute water solutions containing same. In a specific aspect this invention relates to a method for recovering silver and other heavy metals from sea water. In a more specific embodiment this invention relates to a method for recovering silver from sea water by contacting the sea water with an iron- or manganese-containing ion exchange material.

It has been known for many years that valuable metals, such as silver, are present in natural-occurring, dilute water solutions, such as seawater and the like, however, the methods for recovering these metals have been quite impractical and uneconomical. Although silver and other metals are present in sea water in only minute traces, methods which can be carried out on a commercial scale and which are within the realm of practicability are being sought.

It is an object of this invention to provide a novel process for recovering heavy metals from dilute water solutions containing same.

It is another object of this invention to provide a novel process for recovering silver and other heavy metals from sea water.

It is another object of this invention to employ an iron or manganese ion exchange material for the recovery of silver from sea water.

It is another object of this invention to employ an iron or manganese carbonaceous ion exchange material for the recovery of silver from sea water.

Further and additional objects and advantages of my invention will be readily apparent from the disclosure hereinbelow.

I have found that valuable heavy metals, such as silver, can be recovered from dilute water solutions, particularly strong saline solutions, containing the same by passing the solutions into contact with an iron- or manganese-containing ion exchange material. The silver or other heavy metal replaces the iron or manganese in the ion exchange material, and it is readily and conveniently recoverable therefrom.

The use of ion exchange materials or zeolites for the softening of water has been practiced for many years. Metal salts in the water react with the ion exchange material in accordance with the general reaction (1)  $NaZ + MX \rightarrow MZ + NaX$ wherein NaZ is a sodium zeolite and MX is a metal salt, and, as a consequence, the metal in the metal salt undergoes an exchange with the sodium in the zeolite. The chemistry of the ion exchange is that a metal associated with an ion exchange material or zeolite is replaced by a metal more electro-positive than itself. Thus, calcium will replace sodium in accordance with Equation 1, and similarly, iron or manganese will replace calcium. The reaction expressed by Equation 1 is reversible when relatively high concentrations of a salt of the replaced metal, such as NaX in the above equation, are present, and in water softening processes the reversible nature of the reaction is employed to regenerate the zeolitic or ion exchange material. However, when a salt of either iron or manganese is employed as a reactant in Equation 1, the reaction is not reversible. Thus, if a sodium zeolite is reacted with a salt of either iron or manganese, the sodium zeolite cannot be regenerated from the iron or manganese zeolite in the presence of a relatively high concentration of a sodium salt, such as brine.

I have unexpectedly found that materials which are capable of undergoing an ion exchange reaction can be employed to recover valuable heavy metals from such naturally occurring water solutions as sea water. In my process, the water solution containing the valuable heavy metals is contacted with an iron- or manganese-containing ion exchange material, and the heavy metals replace the iron or manganese in the ion exchange material from which they are subsequently recovered. Although I will describe my process in detail hereinbelow, for the recovery of silver from sea water, it will be understood that my process can be similarly employed to recover other valuable metals, such as lead, mercury, bismuth, copper, cadmium, arsenic, antimony and tin, from naturally occurring water solutions containing one or more of these metals.

To effect my process any of the well known zeolites or ion exchange materials may be employed, including the synthetic and naturally-occurring zeolites. These ion exchange materials contain either replaceable hydrogen ions or replaceable ions of metals less electro-positive than iron or manganese, such as sodium or calcium. Some of the common zeolites that may be employed are natrolite  $(Na_2Al_2Si_3O_{10}(H_2O)_2)$
stilbite  $(CaAl_2Si_6O_{16}(H_2O)_6)$
analcine  $(NaAlSi_2O_6(H_2O))$
thomsonite  $(CaNa_2Al_2Si_2O_8(H_2O)_2)$ and artificial zeolites such as permutite. In addition to these sodium and/or calcium zeolites, carbonaceous zeolites such as those described hereinbelow may be employed, as well as synthetic resinous zeolites such as condensation products of polyhydric phenols and aldehydes. Since the carbonaceous zeolites are preferred for my process, I will describe my invention in detail with particular reference to these zeolites.

The zeolite for my process is treated in a manner that the hydrogen or metallic ions are replaced by ions of iron or manganese. This treatment is readily effected by allowing the zeolite to react with a suitable salt of either iron or manganese, preferably a ferric salt. These salts should be soluble and highly ionized in water, and the preferred salts are the chlorides, bromides and nitrates of iron and manganese. The purpose of treating the zeolite with iron or manganese salts is to obtain a zeolite whose metallic ions, in solutions containing high concentrations of sodium and/or calcium ions, are not replaced by those ions. For example, it is well known that sea water contains a relatively high concentration of sodium, and, if an effort were made to recover silver from sea water with a zeolite containing replaceable calcium ions, the concentration of the sodium in the sea water would be sufficiently high to replace the calcium in the zeolite. Thus, the silver in the sea water would not be recovered therefrom. However, when an iron or manganese zeolite is employed to recover silver from sea water, the sodium in the sea water does not replace the iron or manganese ions in the zeolite. The silver in the sea water replaces the iron or manganese in the zeolite, and it can be recovered therefrom.

In the preferred embodiment of my invention a carbonaceous zeolite is employed to recover silver from sea water. A wide range of carbonaceous raw materials is available for preparation of these ion exchange materials. Certain lignites and bituminous coals give particularly good results. Also certain anthracite coals, coke and semi-coke are especially satisfactory in addition to other carbonaceous or carbonizable raw materials, such as wood, charcoal, peat, cork, pitch, tar, sugar, dextrine, certain organic acids and their salts, fats and fatty acids, thickened sulfite waste liquors, soaps and mixtures of these materials. These carbonaceous raw materials are treated with a mineral acid, such as hydrochloric acid or nitric acid, but preferably sulfuric acid, to improve the ion exchange value of the carbonaceous material. The action of the mineral acid on the carbonaceous material is quite complex and little understood, however, it is known that an insoluble material, having ion exchange and cation extracting properties, is produced. When sulfuric acid is employed, the action of the acid can be supplemented or enhanced by the presence of any convenient oxidizing agent, such as perchlorates, chromates, peroxides, permanganates, arsenates, nitrates and ferric salts. The use of the oxidizing agents with the sulfuric acid is known, and it is not to be confused with my treatment of the acid-treated carbonaceous material with iron or manganese salts after the carbonaceous material has been activated with a mineral acid. When a ferric salt is present in the sulfuric acid for treatment of the carbonaceous material, the iron does not enter into the zeolite, and a zeolite, containing ions replaceable by sodium or calcium, is formed. However, in my process the iron or manganese enters into the zeolite to produce a zeolitic material containing no ions replaceable by sodium or calcium.

In my process, after the carbonaceous material has been activated with sulfuric acid, it is washed with distilled water until it is free of sulfate ions. The carbonaceous material is then reacted with an aqueous solution of a salt, preferably a chloride salt, of iron or manganese. During this treatment the iron or manganese replaces the replaceable ions in the carbonaceous material, and an iron or manganese carbonaceous zeolite is produced. This iron or manganese zeolite is ready for use for the recovery of silver or other heavy metals from sea water.

In actual use for the recovery of silver from sea water the iron or manganese zeolite is contacted with the sea water in any suitable manner. In the experimental work that I conducted I suspended a porous crucible containing an iron carbonaceous zeolite in sea water, and silver therein replaced iron in the zeolite. However, in a commercial process it would be necessary to conduct the operation on a larger scale. The process can be economically carried out on a larger scale by employing the iron or manganese zeolite in a bed in a filter tank or a series of filter tanks. The sea water is then pumped to the tank or tanks and permitted to filter through the bed of a zeolite. Subsequently, the thus-treated sea water is returned to its source, preferably at a point reasonably distant from the point from which it was withdrawn for passage to the filter tank or tanks. Since sea water contains microorganisms and other suspended matter, the sea water is preferably filtered for their removal through a bed of a finely divided inert material, such as sand. This inert material may be employed in a filter tank separate from the filter tanks containing the zeolite and through which the sea water is passed prior to passage through the zeolite. Alternatively, the filter tanks containing the zeolite may be provided with a bed of inert material arranged in a manner that the sea water passes through the inert material prior to passage through the zeolite.

After silver and other heavy metals have replaced a substantial amount of the iron or manganese in the zeolite, the flow of sea water through the zeolite is halted, and the zeolite is then treated for recovery of the silver and other heavy metals. One method for effecting such recovery involves passing a mineral acid, such as nitric acid, into contact with the zeolite. Hydrogen ions from the acid replace the ions of silver and other heavy metals in the zeolite, and the metallic ions in the acid can be separated therefrom by deposition on one of the electrodes in an electrolytic process. The zeolite containing replaceable hydrogen ions is then treated with an iron or manganese salt, and it is again ready for use in my process as described hereinabove.

*Example*

A carbonaceous zeolite was activated with sulfuric acid after which the zeolite was washed with distilled water. The zeolite was then reacted with a 5 per cent solution of ferric chloride, acidified with hydrochloric acid. 9 grams of the iron zeolite thus prepared were placed in an Alundum crucible which was suspended in sea water for 45 days. The zeolite was then oxidized to an ash from which 47 milligrams of heavy metals were separated. 20 milligrams of these heavy metals contained metals in the insoluble chloride group which contains lead, silver and mercury (mercurous), and 5 of these 20 milligrams were determined to be silver. 27 milligrams of the heavy metals contained metals in the acid hydrogen sulfide group which contains lead, bismuth, copper, cadmium, mercury (mercuric), arsenic, antimony and tin.

Since organic suspended matter in sea water collected on the zeolite and the crucible to hinder the diffusion of sea water through the zeolite, results superior to those set forth above could have been obtained by filtering the sea water prior to contact with the zeolite.

From the disclosure of my invention numerous modifications within the scope of my process will be apparent to those skilled in the art.

I claim:

1. The process for removing heavy metals from an aqueous saline solution containing same which comprises contacting said aqueous solution with an ion exchange material containing replaceable ions of iron.

2. The process for recovering heavy metals from sea water which comprises contacting an ion exchange material containing ions replaceable by iron with an iron salt, contacting sea water with ion exchange material thus-formed, and recovering heavy metals from the ion exchange material.

3. The process for recovering silver from sea water which comprises contacting an ion exchange material containing ions replaceable by iron with an iron salt, contacting sea water with iron-containing ion exchange material thus-formed, and recovering silver from the ion exchange material.

4. A process according to claim 3 wherein the iron salt is ferric chloride.

5. The process for recovering silver from sea water which comprises contacting a carbonaceous ion exchange material with an iron salt, contacting sea water with iron-containing ion exchange material thus-formed, and recovering silver from the ion exchange material.

6. The process for recovering silver from sea water which comprises activating a bituminous ion exchange material with sulfuric acid, washing sulfate ions from thus-activated ion exchange material, contacting the washed ion exchange material with ferric chloride, contacting the iron-containing ion exchange material with sea water, and recovering silver from the ion exchange material.

7. The process for recovering silver from sea water which comprises contacting an ion exchange material containing ions replaceable by iron with an iron salt, contacting sea water with iron-containing ion exchange material thus-formed, removing said ion exchange material from contact with said sea water, contacting said ion exchange material with a mineral acid, and recovering silver dissolved by said acid by subjecting said acidic solution to electrolysis.

8. The process for recovering silver from sea water which comprises contacting an ion exchange material containing ions replaceable by iron with an iron salt, contacting sea water with iron-containing ion exchange material thus formed, oxidizing said ion exchange material to an ash, and recovering the silver from said oxidized ion exchange material.

JESSE M. BROOKE.

References Cited in the file of this patent

UNITED STATES PATENTS

| Number | Name | Date |
|---|---|---|
| 951,641 | Gans | Mar. 8, 1910 |
| 2,198,378 | Ellis | Apr. 23, 1940 |
| 2,214,689 | Burrell | Sept. 10, 1940 |
| 2,260,971 | Goetz | Oct. 28, 1941 |

OTHER REFERENCES

"Ion Exchange," Nachod, F. C. (Editor), Academic Press, Inc., 1949, pages 119–120; 235; 245–247. (Copy in Scientific Library.)

Gans, R., "Chem. Ind.," vol. 32, pages 197–200 (1909).